3,137,563
TREATMENT OF TREES
Jack S. Newcomer, Wilson, Edward D. Weil, Lewiston, and Edwin Dorfman, Grand Island, N.Y., assignors to Hooker Chemical Corporation, Niagara Falls, N.Y., a corporation of New York
No Drawing. Filed Aug. 17, 1959, Ser. No. 833,908
4 Claims. (Cl. 71—2.6)

This invention relates to a synergistic plant growth regulatory composition. More particularly this invention resides in a novel herbicidal composition comprising 2,3,6-trichlorophenylacetic acid with other trichlorophenylacetic acids. This application is a continuation-in-part of copending application Serial Number 692,046, filed in the United States Patent Office on October 24, 1957, now abandoned.

This mixture of trichlorophenylacetic acids possesses new and unobvious properties not logically predictable from the additivity of the individual activities of the ingredient compounds. Applicants have disclosed in Serial Number 692,046 the powerful effect the 2,3,6-trichlorophenylacetic acid has on plant life. By contrast 2,4,5- and 2,3,4-trichlorophenylacetic acids have been found to be substantially inactive. It has now been found that mixtures of 2,3,6-, 2,4,5-, and 2,3,4-trichlorophenylacetic acids have plant growth inhibitory activity in excess of that which would be given by the additivity of their individual activities, and in fact this composition exhibits activity as great as the pure 2,3,6-trichlorophenylacetic acid. Such synergistic mixtures have utility as economic substitutes for the pure 2,3,6-trichlorophenylacetic acid for such purposes as tree growth inhibition, inhibition of the growth of ornamental hedges, etc.

The inhibition of plant growth is of importance, for example, in preventing trees occurring beneath or adjacent to power lines or telephone lines from growing into and interfering with such lines. It has also been shown that certain vascular tree diseases such as the Dutch elm disease can be combatted by suitable tree growth retardants. The inhibition of turf growth without destruction of the turf grasses has value in conserving labor otherwise expended on mowing.

The mixtures of the invention are also useful for destroying weeds, as is the pure 2,3,6-isomer. The synergistic mixture of this invention may be prepared by the ring chlorination of phenylacetic acid or by the introduction of a carboxyl group onto the methyl side chain of the mixed trichlorotoluenes made by ring chlorination of toluene or o-chlorotoluene. Such introduction of a carboxyl may be done by photochlorination of the side chain to introduce one chlorine atom, followed by reaction with magnesium in ether and treatment of the resultant Grignard reagent with carbon dioxide, or by other synthetic means.

The proportions of the isomers used is not critical, although the synergistic effect is small and virtually of no practical importance when one isomer greatly predominates. A preferred range is 40–70 percent of the 2,3,6-, 30–45 percent of the 2,4,5-, and 0–20 percent of the 2,3,4-isomer, such mixtures being inexpensive ones prepared by the method above defined.

The mixtures of the invention may be employed in the free acid form, dissolved or dispersed in a carrier such as water or an organic solvent, or on a solid carrier such as clay or vermiculite. Also, the acids may be employed in the form of their water soluble salts, such as the sodium, potassium, or organic amine salts, and such salts may be used dry or in water solution. The acids of the invention may also be employed in the form of readily hydrolyzable derivatives such as halides, anhydrides, esters, and amides which spontaneously become converted to the corresponding acids at the locus of action.

To avoid the complications and inaccuracies of field data, we have chosen to present, for the purposes of illustrating our invention, data obtained by the plant growth regulatory bioassay method described in "Test Methods with Plant Regulating Chemicals," U.S. Department of Agriculture Handbook No. 126 (1958), page 58. Briefly this method is as follows: Cucumber seeds are germinated on filter paper pods impregnated with the solution at the desired concentration of the growth regulant to be tested. After the roots of the seedlings of the controls have reached 20–40 mm. in length, the percentage of inhibition of root growth of the treated seedlings is measured relative to the controls. Thus the concentration of the growth regulator required to inhibit root elongation of cucumber seedlings by 50 percent is determined. The tests were carried out substantially as described and the percentage of inhibition of root growth calculated relative to a control without any chemical. The relative activities of the various test compounds are defined as the reciprocal of the 50 percent inhibitory concentration for the test compound divided by the reciprocal of the 50 percent inhibitory concentration for 2,3,6-trichlorophenylacetic acid, and are presented in the table below.

TABLE I

*Relative Growth Regulatory Activity of Trichlorophenylacetic Acids as Measured by Cucumber Root Elongation Tests*

| Compound | Relative Activity |
|---|---|
| (A) 2,3,6-trichlorophenylacetic acid | 1. |
| (B) 2,4,5-trichlorophenylacetic acid | Less than 0.1. |
| (C) 2,3,4-trichlorophenylacetic acid | Do. |
| (D) Mixture of 40% 2,3,6-, 45% 2,4,5- and 15% 2,3,4-trichlorophenylacetic acid. | 1. |
| (E) Mixture of 65% 2,3,6-, 35% 2,4,5-trichlorophenylacetic acid. | 1. |

These results are borne out in field tests with the pure 2,3,6- and 2,4,5-trichlorophenylacetic acids and with mixtures of approximately equal amounts of 2,3,6- and 2,4,5- (with traces of 2,3,4) trichlorophenylacetic acid isomers. At the rates of 1 pound per 100 gallons (as the sodium salts) in water sprayed (to the point of run off) onto the foliage of 6–12′ ash trees, equally effective growth inhibition was obtained with pure 2,3,6-isomer and with the mixture, while the pure 2,4,5-isomer was without effect.

The examples which have been described in the foregoing specification have been given for purposes of illustration, not limitation. Many other modifications and ramifications will naturally suggest themselves to those skilled in the art, based on the disclosure of our basic discovery. These are intended to be comprehended within the scope of our invention.

We claim:
1. A method for the treatment of trees which comprises applying to the media to be treated a sublethal growth retarding amount of a composition comprising a mixture of trichlorophenylacetic acids consisting essentially of 40 to 70 percent by weight of the 2,3,6-trichlorophenylacetic acid, 20 to 45 percent by weight of the 2,4,5-trichlorophenylacetic acid and 0 to 20 percent by weight of the 2,3,4-trichlorophenylacetic acid.
2. The method of claim 1 wherein the composition comprises about 50 percent by weight of 2,3,6-trichlorophenylacetic acid, about 35 percent by weight of 2,4,5-trichlorophenylacetic acid and about 15 percent by weight of 2,3,4-trichlorophenylacetic acid.

3. The method of claim 1 wherein the composition comprises about 65 percent by weight of 2,3,6-trichlorophenylacetic acid and about 35 percent by weight of 2,4,5-trichlorophenylacetic acid.

4. The method of claim 1 wherein the composition comprises about equal parts by weight of 2,3,6-trichlorophenylacetic acid and 2,4,5-trichlorophenylacetic acid.

References Cited in the file of this patent
UNITED STATES PATENTS

| | | |
|---|---|---|
| 2,394,916 | Jones | Feb. 12, 1946 |
| 2,444,905 | Sexton | July 13, 1948 |
| 2,848,470 | Girard et al. | Aug. 19, 1958 |
| 2,977,212 | Tischler | Mar. 28, 1961 |

OTHER REFERENCES

Ahlgren et al.: Principles of Weed Control, copyright 1951, pages 226–243.

Melnikov et al., in Chemical Abstracts, vol. 48, 1954, col. 639g and 6399a.